(12) United States Patent
Kojima et al.

(10) Patent No.: US 12,107,862 B2
(45) Date of Patent: Oct. 1, 2024

(54) DEVICE, METHOD, AND MEDIUM FOR USING REGISTERED A SURVEILLANCE CAMERA AT A WORK TARGET HAVING ACCESS PERMISSION TO PERMIT ACCESS

(71) Applicant: Yokogawa Electric Corporation, Tokyo (JP)

(72) Inventors: Osamu Kojima, Tokyo (JP); Atsushi Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 319 days.

(21) Appl. No.: 17/449,816

(22) Filed: Oct. 4, 2021

(65) Prior Publication Data

US 2022/0131867 A1 Apr. 28, 2022

(30) Foreign Application Priority Data

Oct. 23, 2020 (JP) ................................ 2020-178475

(51) Int. Cl.
| | | |
|---|---|---|
| H04L 9/40 | (2022.01) | |
| H04N 7/18 | (2006.01) | |
| H04N 21/2187 | (2011.01) | |
| H04N 23/661 | (2023.01) | |
| G06F 21/35 | (2013.01) | |
| H04N 23/66 | (2023.01) | |

(52) U.S. Cl.
CPC ............ H04L 63/102 (2013.01); H04L 63/08 (2013.01); H04L 63/10 (2013.01); H04N 7/183 (2013.01)

(58) Field of Classification Search
None
See application file for complete search history.

(56) References Cited

U.S. PATENT DOCUMENTS

| | | | | |
|---|---|---|---|---|
| 2005/0018766 A1* | 1/2005 | Iwamura | .......... | G08B 13/19669 348/E7.051 |
| 2007/0150565 A1* | 6/2007 | Ayyagari | ................ | H04L 67/12 709/223 |
| 2007/0195776 A1* | 8/2007 | Zheng | ................... | H04L 63/102 370/392 |

(Continued)

FOREIGN PATENT DOCUMENTS

| | | |
|---|---|---|
| CN | 101964901 A | 2/2011 |
| CN | 102340650 A | 2/2012 |
| JP | 2015162232 A | 9/2015 |

OTHER PUBLICATIONS

Office Action issued for counterpart Japanese Application No. 2020-178475, issued by the Japanese Patent Office on Mar. 14, 2023 (drafted on Mar. 7, 2023).

(Continued)

*Primary Examiner* — Venkat Perungavoor (57) ABSTRACT

A device including a registration unit, access permission unit, and an access prohibition unit. The registration unit registers a surveillance camera that is a work target. The access permission unit permits access from a worker terminal to an image captured by the registered surveillance camera via a surveillance network to which the surveillance camera is connected. The access prohibition unit configured to prohibits the access in response to work on the surveillance camera being completed. Security of the image captured by the surveillance camera is thereby enhanced.

18 Claims, 4 Drawing Sheets

(56) References Cited

U.S. PATENT DOCUMENTS

| | | |
|---|---|---|
| 2007/0285270 A1 | 12/2007 | Gunn |
| 2010/0245584 A1* | 9/2010 | Minasyan ........... G08B 13/1968 |
| | | 348/E7.085 |
| 2012/0044354 A1* | 2/2012 | Cheng .................... H04N 7/183 |
| | | 348/207.1 |
| 2012/0062733 A1* | 3/2012 | Mironichev ........... G08C 17/00 |
| | | 348/143 |
| 2012/0236147 A1 | 9/2012 | Addy |
| 2013/0307975 A1* | 11/2013 | Ford ........................ B60Q 1/00 |
| | | 340/815.4 |
| 2014/0132763 A1 | 5/2014 | Billau |
| 2015/0341210 A1* | 11/2015 | Ranbro ............... H04L 41/0809 |
| | | 709/222 |
| 2017/0070657 A1* | 3/2017 | Yokomizo ................ H04N 5/77 |
| 2017/0155970 A1* | 6/2017 | Cao ......................... H04L 69/40 |
| 2018/0213267 A1* | 7/2018 | Khoshbin .......... H04N 21/2187 |
| 2019/0289262 A1* | 9/2019 | Harms ................... H04N 7/183 |
| 2021/0344877 A1* | 11/2021 | Drako .................. G08B 25/016 |

OTHER PUBLICATIONS

Extended European Search Report for European Patent Application No. 21202152.1, issued by the European Patent Office on Feb. 23, 2022.
Office Action issued for counterpart Chinese Application 202111232622.3, issued by The State Intellectual Property Office of People's Republic of China on Aug. 12, 2024.

* cited by examiner

DEVICE, METHOD, AND MEDIUM FOR USING REGISTERED A SURVEILLANCE CAMERA AT A WORK TARGET HAVING ACCESS PERMISSION TO PERMIT ACCESS

The contents of the following Japanese patent application(s) are incorporated herein by reference:
2020-178475 filed in JP on Oct. 23, 2020

BACKGROUND

1. Technical Field

The present invention relates to a device, a method, and a storage medium.

2. Related Art

In the related art, various security systems using surveillance cameras have been proposed (for example, refer to Patent Document 1).
[Patent Document 1] Japanese Patent Application Publication No. 2015-162232

SUMMARY

A first aspect of the present invention provides a device. The device may include a registration unit configured to register a surveillance camera that is a work target. The device may include an access permission unit configured to permit access from a worker terminal to an image captured by the registered surveillance camera via a surveillance network to which the surveillance camera is connected. The device may include an access prohibition unit configured to prohibit the access in response to work on the surveillance camera being completed.

A second aspect of the present invention provides a method. The method may include registering a surveillance camera that is a work target. The method may include permitting access from a worker terminal to an image captured by the registered surveillance camera via a surveillance network to which the surveillance camera is connected. The method may include prohibiting the access in response to work on the surveillance camera being completed.

A third aspect of the present invention provides a storage medium having stored thereon a program. The program may cause a computer to function as a registration unit configured to register a surveillance camera that is a work target. The program may cause a computer to function as an access permission unit configured to permit access from a worker terminal to an image captured by the registered surveillance camera via a surveillance network to which the surveillance camera is connected. The program may cause a computer to function as an access prohibition unit configured to prohibit the access in response to work on the surveillance camera being completed.

The summary clause does not necessarily describe all necessary features of the embodiments of the present invention. The present invention may also be a sub-combination of the features described above.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential for means to solve the problem in the invention.

1. Security System 1

Figure 1:
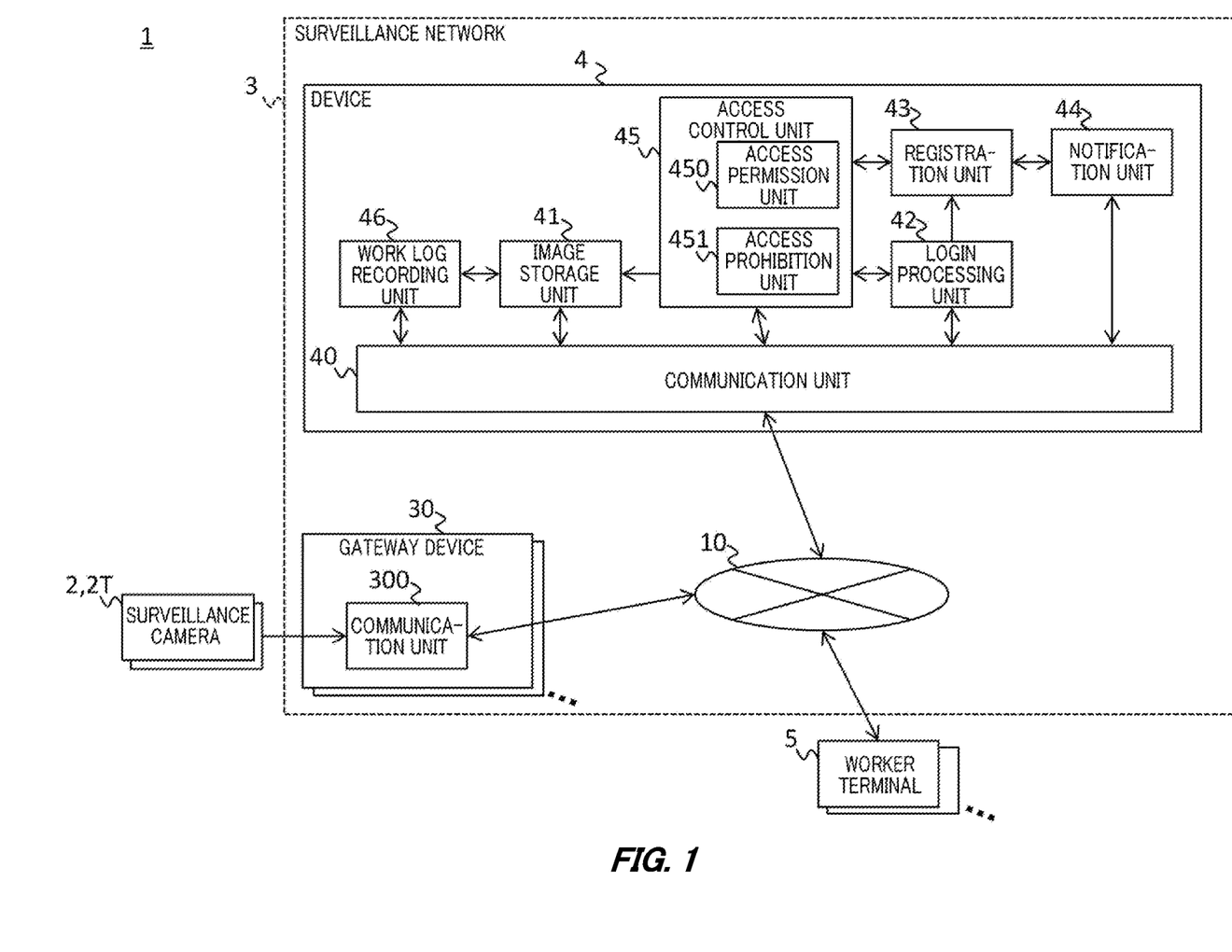
FIG. 1 shows a security system 1 according to the present embodiment.

FIG. 1 shows a security system 1 according to the present embodiment. The security system 1 includes one or more surveillance cameras 2, a surveillance network 3 to which each surveillance camera 2 is connected, and one or more worker terminals 5 that are operated, by a worker, for the surveillance camera 2. Note that work performed on the surveillance camera 2 may be installation work of the surveillance camera 2, or may be maintenance work such as replacement, repair, location adjustment, or the like of the surveillance camera 2.

[1.1. Surveillance Camera 2]

Each surveillance camera 2 captures an image capturing region. Each surveillance camera 2 may provide an image (also referred to as a captured image), which is acquired by image capturing, to the surveillance network 3. The image may be a moving image, and the surveillance camera 2 may constantly capture the image to generate the moving image (also referred to as a video) data. For example, each surveillance camera 2 may capture the image at 30 frames per second. Note that the image may be a still image. In this case, the surveillance camera 2 may capture the image at regular timing and generate the still image. The surveillance camera 2 may be a visible light camera, or may be an infrared or ultraviolet (as an example, an X-ray) camera.

Each surveillance camera 2 may be arranged on a road, a parking lot, a street lamp, or utility pole, or may be arranged at a doorway, a passageway, or the like of a facility. The facility may be a plant, may be a school, a house, a train station, an airport, a museum, a hospital, a store (as an example, a restaurant), or the like, or may be a theme park, an amusement park, attraction facilities of these, or the like. An example of the plant includes: in addition to industrial plants relating to chemistry, biotechnology, and the like, plants for managing and controlling wellheads in a gas field, an oil field, and the like, and their surroundings; plants for managing and controlling power generation of hydroelectric power, thermal power, nuclear power, and the like; plants for managing and controlling energy harvesting from solar power, wind power, and the like; plants for managing and controlling water and sewerage, dams, and the like; and the like.

[1.2. Surveillance Network 31]

The surveillance network 3 performs surveillance on the image capturing region by using the one or more surveillance cameras 2 connected thereto. The surveillance network 3 may be a collection of computers capable of communicating captured images, and includes one or more gateway devices 30 and a device 4.

Each gateway device 30 and the device 4 may be connected via a communication network 10. The communication network 10 may be configured to include various types of networks such as the Internet, a wide area network (WAN), and a local area network, or a combination thereof. The communication network 10 may include at least one of a wired connection point and a wireless connection point. The communication network 10 may be realized by a dedicated line separated from a public line such as the Internet.

[1.2.1. Gateway Device 30]

Each gateway device 30 performs relaying between the one or more surveillance cameras 2 and the device 4. Each gateway device 30 has a communication unit 300.

The communication unit 300 communicates with each surveillance camera 2 connected to the gateway device 30, and acquires the captured image. Note that as an example in the present embodiment, the communication unit 300 is described to be directly connected to each surveillance camera 2, but may be connected via the communication network 10.

In addition, the communication unit 300 communicates with the device 4 via the communication network 10, and provides the image captured by each surveillance camera 2 to the device 4.

[1.2.2 Device 4]

The device 4 cooperates with the plurality of surveillance cameras 2 to support security of the facility. The device 4 has a communication unit 40, an image storage unit 41, a login processing unit 42, a registration unit 43, a notification unit 44, an access control unit 45, and a work log recording unit 46.

[1.2.2 (1). Communication Unit 40]

The communication unit 40 communicates with the gateway device 30, the worker terminal 5, and the like via the communication network 10.

[1.2.2 (2). Image Storage Unit 41]

The image storage unit 41 stores the image that is captured by the surveillance camera 2 and that is provided from the gateway device 30. The image storage unit 41 may store the captured image for each surveillance camera 2, and as an example in the present embodiment, the captured image may be stored in association with identification information (also referred to as a camera ID) of the surveillance camera 2.

[1.2.2 (3). Login Processing Unit 42]

The login processing unit 42 receives a login of the worker. The login may be performed to temporarily use the surveillance network 3 to check the image captured by the surveillance camera 2 (also referred to as a surveillance camera 2T) that is a work target. The login may be performed by the worker terminal 5.

Authentication information (as an example, an account name and password) of the worker may be internally saved in the login processing unit 42 in advance. The login processing unit 42 may set the worker terminal 5 to be in a login state to the surveillance network 3 in response to matching of the authentication information input from the worker terminal 5, and any authentication information internally saved in advance. In response to the worker terminal 5 being in the login state, the login processing unit 42 may provide a notification of the fact to the registration unit 43, the access control unit 45, and the worker terminal 5. In addition, the login processing unit 42 may provide, to the registration unit 43, contents input by the worker via the worker terminal 5 in the login state.

The login processing unit 42 may shift a state of the worker terminal 5 from the login state to a logout state in response to an operation of instructing the worker terminal 5 to log out, or the like.

[1.2.2 (4). Registration Unit 43]

The registration unit 43 registers the surveillance camera 2T that is the work target. The registration unit 43 may register the contents input by the worker via the worker terminal 5.

Here, registering the surveillance camera 2T may mean registering the camera ID of the surveillance camera 2T. The registering means, as an example in the present embodiment, internally saving the registered contents, but may mean saving the registered contents in an external storage area. The registered contents may be capable of being referred to by the access control unit 45.

The registration unit 43 may register a contact address (as an example in the present embodiment, an e-mail address) of the worker in association with the camera ID of the surveillance camera 2T. The registration unit 43 may register identification information (also referred to as a terminal ID) of the worker terminal 5 and work contents for the surveillance camera 2T additionally in association with the camera ID of the surveillance camera 2T.

[1.2.2 (5). Notification Unit 44]

The notification unit 44 transmits a notification to the contact address of the worker, in response to the registered surveillance camera 2T being connected to the surveillance network 3 and being activated. The notification unit 44 may transmit the notification to the contact address associated with the surveillance camera 2T by the registration unit 43. This makes it possible for the worker to request, in order to check the image captured by the surveillance camera 2T that is the work target, access from the worker terminal 5 to the captured image.

[1.2.2 (6). Access Control Unit 45]

The access control unit 45 controls the access from the worker terminal 5 to the captured image of the surveillance camera 2T. The access control unit 45 may have an access permission unit 450 and an access prohibition unit 451.

[1.2.2 (6-1). Access Permission Unit 450]

The access permission unit 450 permits the access from the worker terminal 5 to the image captured by the registered surveillance camera 2T via the surveillance network 3. For example, the access permission unit 450 may permit the access from the worker terminal 5 to the captured image in the image storage unit 41. As an example in the present embodiment, the access permission unit 450 may permit the access from the worker terminal 5 to the captured image associated with the camera ID of the registered surveillance camera 2T in the image storage unit 41. The access permission unit 450 may permit the worker terminal 5 to have the access in response to receiving a request, from the worker terminal 5, for the access to the image captured by the registered surveillance camera 2T.

Permitting the access from the worker terminal 5 to the captured image may mean permitting the captured image to be transmitted to the worker terminal 5. With respect to the communication unit 40, the access permission unit 450 may permit the captured image to be transmitted to the worker terminal 5, the captured image being read from the image storage unit 41. In addition to this, with respect to the image storage unit 41, the access permission unit 450 may permit the captured image to be read.

[1.2.2 (6-2). Access Prohibition Unit 451]

The access prohibition unit 451 prohibits the access in response to the work on the surveillance camera 2T being completed. For example, the access prohibition unit 451 may prohibit the access in response to receiving, from the worker terminal 5, a notification (also referred to as a work completion notification) indicating that the work is completed.

The access prohibition unit 451 may prohibit the access permitted by the access permission unit 450. For example, with respect to the communication unit 40, the access prohibition unit 451 may prohibit the captured image from being transmitted to the worker terminal 5, the captured image being read from the image storage unit 41. In addition to this, with respect to the image storage unit 41, the access prohibition unit 451 may prohibit the captured image from being read.

[1.2.2 (7). Work Log Recording Unit 46]

The work log recording unit 46 records the image captured by the surveillance camera 2T as a work log for the surveillance camera 2T. The work log recording unit 46 may internally save the work log.

[1.3. Worker Terminal 5]

The worker terminal 5 is a terminal operated by the worker who performs the work (as an example, the installation work or the maintenance work) on the surveillance camera 2. Note that the worker is not limited to a person who directly works on the surveillance camera 2, and may be also a person (as an example, a supervisor) who indirectly works via another person who directly works.

The worker terminal 5 may be able to communicate with the device 4 via the communication network 10, or may read, from the image storage unit 41, the captured image to which the access is permitted by the access control unit 45, and display the read captured image. The worker terminal 5 may be a handheld terminal (HHT) (as an example, a smartphone or a tablet PC).

[1.4. Effect Obtained from Device 4]

With the above-described device 4, the access from the worker terminal 5 to the image captured by the surveillance camera 2T via the surveillance network 3 is permitted, and thus it is possible for the worker terminal 5 to check, during the work, how the image captured by the surveillance camera 2T looks, in the surveillance network 3. In addition, the access to the registered surveillance camera 2T is permitted, and then the access is prohibited in response to the work on the surveillance camera 2T being completed, and thus the image captured by the surveillance camera 2T can be prevented from being seen by the worker terminal 5 before the work or after the work. Accordingly, it is possible to ensure security of the image captured by the surveillance camera 2, and to perform the work on the surveillance camera 2T promptly and appropriately.

In addition, the image captured by the registered surveillance camera 2T is permitted to be transmitted to the worker terminal 5, and thus it is possible to reliably provide the access from the worker terminal 5 to the image captured by the surveillance camera 2T.

In addition, in response to the registered surveillance camera 2T being connected to the surveillance network 3 and being activated, the notification is transmitted to the contact address of the worker, and thus it is possible to prevent access to the captured image by a third party whose contact address is not registered, and to further enhance the security of the captured image. In addition, the worker can access the captured image after the image is capable of being captured by the surveillance camera 2T, and thus it is possible to prevent unnecessary access to the captured image before the image is capable of being captured by the surveillance camera 2T, and to enhance work efficiency.

In addition, the access is prohibited in response to the work completion notification, and thus it is possible to reliably prohibit the access to the captured image after the work ends, and to enhance the security of the captured image.

In addition, the image captured by the surveillance camera 2T is recorded as a work log for the surveillance camera 2T, and thus it is possible to easily check the work contents.

2. Operation

[2.1. Registration of Surveillance Camera 2T]

Figure 2:
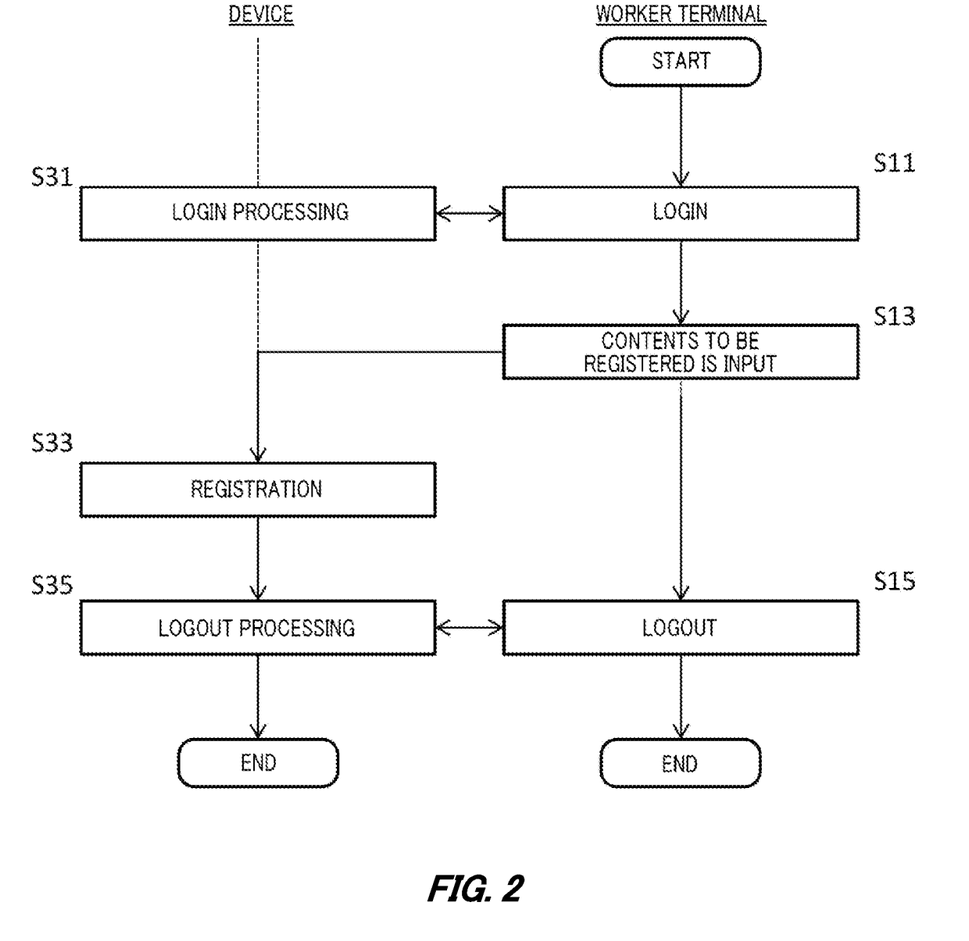
FIG. 2 shows an operation relating to registration of a surveillance camera 2T.

FIG. 2 shows an operation relating to registration of a surveillance camera 2T. The security system 1 registers the surveillance camera 2T that is the work target by performing processing of steps S11 to S15, and steps S31 to S35. Note that during these operations, the worker terminal 5 may be located at a location different from an installation location of the surveillance camera 2T.

In step S11, the worker terminal 5 logs in to the surveillance network 3 according to the operation of the worker. The worker terminal 5 may provide, to the device 4, the authentication information input by the worker.

In step S31, the login processing unit 42 of the device 4 receives the login of the worker and performs the login processing. The login processing unit 42 may set the worker terminal 5 to be in the login state to the surveillance network 3 in response to matching of the authentication information provided from the worker terminal 5, and any authentication information internally saved in advance. Thereby, in step S13 described below, an input for the surveillance camera 2T is performed by the worker terminal 5 in the login state.

In step S13, the worker terminal 5 receives, from the worker, the input of the contents to be registered to the registration unit 43 such as the camera ID of the surveillance camera 2T that is the work target, the contact address (as an example in the present embodiment, the e-mail address) of the worker, and the terminal ID and the work contents of the worker terminal 5. When there are a plurality of surveillance cameras 2T that are work targets, the worker terminal 5 may receive inputs of a plurality of camera IDs.

Note that as an example in the present embodiment, the worker inputs, as the camera ID, a MAC address of the surveillance camera 2T, but may input any other identification information. For example, when the surveillance camera 2T that is the work target (as an example, the surveillance camera 2T that is a target of a location adjustment) is already used in the surveillance network 3, the worker may input, as the camera ID, an IP address of the surveillance camera 2T, an identification code assigned to the surveillance camera 2T in the surveillance network 3.

In addition, when the surveillance camera 2T that is the work target is already used in the surveillance network 3, and the worker terminal 5 is in the login state to the surveillance network 3, the worker may be able to check the camera ID of each surveillance camera 2 in use in the surveillance network 3 on a list or a map, or may specify the camera ID of any surveillance cameras 2, instead of inputting the camera ID.

In step S33, the registration unit 43 registers the surveillance camera 2T that is the work target. The registration unit 43 may register the camera ID, the contact address of the worker, the terminal ID, or the like in association with each other, which is input in step S13. When the plurality of camera IDs are input in step S13, the registration unit 43 may register each camera ID. When the surveillance camera 2T is specified, by the worker, via the worker terminal 5 in the login state in step S13, the registration unit 43 may register the specified surveillance camera 2T.

In step S15, the worker terminal 5 logs out of the surveillance network 3 according to the operation of the worker.

In step S35, the login processing unit 42 shifts the state of the worker terminal 5 to the logout state.

With the above-described operation, the surveillance camera 2T specified by the worker in the login state is registered, and thus it is possible to facilitate the work of inputting the camera ID. In addition, it is possible to enhance the security of the image captured by the surveillance camera 2 in comparison with a case where the surveillance camera 2 is registered without requiring the login.

[2.2. Work Support for Surveillance Camera 2T]

Figure 3:
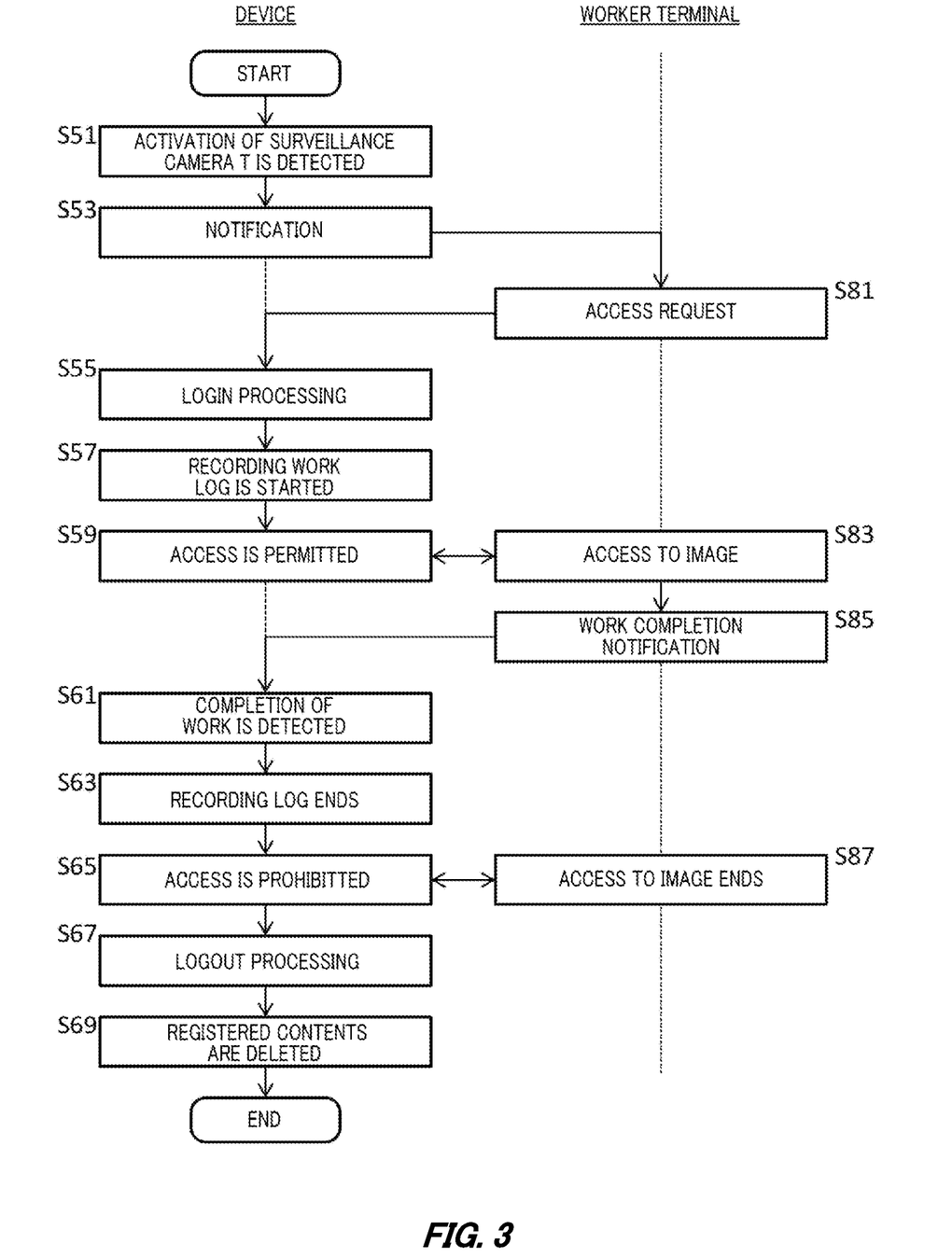
FIG. 3 shows an operation relating to a work support for the surveillance camera 2T.

FIG. 3 shows an operation relating to a work support for the surveillance camera 2T. The security system 1 supports the work on the surveillance camera 2T by performing processing of steps S51 to S69, and steps S81 to S87. The support operation of this work may be performed after the registration operation of the surveillance camera 2T. In addition, the worker terminal 5 may be located at the installation location of the surveillance camera 2T during the work support operation.

In step S51, the notification unit 44 detects that the registered surveillance camera 2T is connected to the surveillance network 3 and is activated.

For example, each surveillance camera 2T may conform to a UPnP (Universal Plug and Play) standard, or may be capable of being found by each device on the surveillance network 3 by being connected to the surveillance network 3 and being activated. In this case, the notification unit 44 may acquire a camera ID of a newly found surveillance camera 2T, and detect the connection and the activation of the surveillance camera 2T in response to matching of this camera ID, and the camera ID of the registered surveillance camera 2T.

Instead of this, the gateway device 30 to which the surveillance camera 2T is connected may acquire, from each connected surveillance camera 2T, the captured image and the camera ID in association with each other, and provide the captured image and the camera ID to the device 4. In this case, the notification unit 44 may detect the connection and the activation of the surveillance camera 2T in response to matching of this camera ID provided from the gateway device 30, and the camera ID of the registered surveillance camera 2T.

When the plurality of surveillance cameras 2T are registered in the registration unit 43, the notification unit 44 may respectively detect that the plurality of registered surveillance cameras 2T are connected to the surveillance network 3 and are activated.

Note that when the surveillance camera 2T is connected to the surveillance network 3 and is activated, image capturing by the surveillance camera 2T may be started for the captured image to be sequentially stored in the image storage unit 41 of the device 4 via the gateway device 30.

In step S53, the notification unit 44 transmits the notification to the contact address of the worker. As an example in the present embodiment, the notification unit 44 may transmit a notification e-mail to the e-mail address of the worker registered in association with the camera ID of the surveillance camera 2T. The notification may be received by the worker terminal 5. When the plurality of surveillance cameras 2T are registered in the registration unit 43, the notification unit 44 may transmit the notification each time the connection and the activation of each surveillance camera 2T are detected in step S51, or may transmit the notification in response to the connections and activations of all the surveillance cameras 2T being detected.

The notification may include the camera ID of the surveillance camera 2T of which the connection and the activation are detected. The notification may also include a link to the image captured by the surveillance camera 2T of which the connection and the activation are detected. The link may include a URL of the captured image as an example.

Note that in a case where the surveillance camera 2T is already in the activation state such as a case where the maintenance work is performed on the surveillance camera 2T, the processing of steps S51 and S53 may not be performed, and the notification may be transmitted from the device 4 to the worker terminal 5 after the registration in step S33 without the processing of step S51 being performed.

In step S81, the worker terminal 5 requests the access to the image captured by the surveillance camera 2T. The access request may include the terminal ID of the worker terminal 5 and the camera ID of the surveillance camera 2T that is the work target (as an example in the present embodiment, the camera ID included in the notification transmitted in step S53). When the notification transmitted in step S53 described above includes the link to the captured image, the link instead of the camera ID may be included in the access request. The access request may further include the authentication information input by the worker.

In step S55, the login processing unit 42 performs the login processing by using the authentication information included in the access request. The login processing unit 42 may set the worker terminal 5 to be in the login state to the surveillance network 3 in response to matching of the authentication information included in the access request, and any authentication information internally saved in advance. Thereby, in step S59 described below, the access from the worker terminal 5, which is in the login state, is permitted.

Note that when the plurality of surveillance cameras 2T are registered in the registration unit 43, and the notification in step S53 and the access request in step S81 are sequentially made, the login processing unit 42 may maintain the worker terminal 5 to be in the login state without performing the login processing in the second and subsequent access requests.

In step S57, the work log recording unit 46 starts recording the work log for the surveillance camera 2T corresponding to the access request. As an example in the present embodiment, the work log recording unit 46 may record, as a work log, the image captured by the surveillance camera 2T in association with the camera ID and the terminal ID of the worker terminal 5. The captured image may include a work date, a start time and a completion time of the work, worker name, work contents, or the like shown on a whiteboard directed to the surveillance camera 2T, a display of the worker terminal 5, or the like. Note that the processing of step S57 may be performed at another timing from step S51 to step S61.

In step S59, the access permission unit 450 permits the access from the worker terminal 5 to the image captured by the surveillance camera 2T via the surveillance network 3. The access permission unit 450 may detect the camera ID and the terminal ID included in the access request, to permit the worker terminal 5 with the terminal ID to access the image captured by the surveillance camera 2T with the camera ID. The access permission unit 450 may permit the access in response to matching of the camera ID and the terminal ID included in the access request, and the camera ID and the terminal ID registered in the registration unit 43. When the access request includes the link to the captured image, the access permission unit 450 may permit the worker terminal 5, which has the terminal ID included in the access request, to access the captured image of a link destination.

Note that when the plurality of surveillance cameras 2T are registered in the registration unit 43 and the notification in step S53 and the access request in step S81 are sequentially made, the access permission unit 450 may permit the access to the corresponding captured image for each access request.

In step S83, the worker terminal 5 accesses the captured image to which the access is permitted. The worker terminal 5 may read the image captured by the surveillance camera 2T from the image storage unit 41 of the device 4 and display the read captured image. This makes it possible for the worker to work on the surveillance camera 2T while checking the image captured by the surveillance camera 2T.

Note that when the access is permitted to images captured by the plurality of surveillance cameras 2T, the worker terminal 5 may respectively display the images captured by the plurality of surveillance cameras 2T. As an example, the worker terminal 5 may display the images captured by the plurality of surveillance cameras 2T side by side, or may sequentially switch and display the images. This makes it possible for the worker to adjust the locations of the image capturing regions for the plurality of surveillance cameras 2T while checking the images captured by the plurality of surveillance cameras 2T.

In step S85, the worker terminal 5 provides the work completion notification to the device 4 in response to the operation of the worker. The work completion notification may include the camera ID of the surveillance camera 2T and the terminal ID of the worker terminal 5

Note that when the access is permitted to the images captured by the plurality of surveillance cameras 2T in step S59, the work completion notification may be provided to the device 4 each time the work of each surveillance camera 2T is completed, or may be provided to the device 4 in response to the work of all the surveillance cameras 2T being completed.

In step S61, the work log recording unit 46, the access prohibition unit 451, the login processing unit 42, and the registration unit 43 detect the completion of the work in response to receiving the work completion notification.

In step S63, the work log recording unit 46 ends recording the work log for the surveillance camera 2T for which the work completion is detected. The work log recording unit 46 may provide the created work log to the worker terminal 5 that is indicated by the terminal ID associated with the work log.

In step S65, the access prohibition unit 451 prohibits the access from the worker terminal 5 to the image captured by the surveillance camera 2T for which the work completion is detected. Thereby, in step S87, the worker terminal 5 ends the access to the captured image.

In step S67, the login processing unit 42 shifts the state of the worker terminal 5 to the logout state. Note that when the access is permitted to the images captured by the plurality of surveillance cameras 2T in step S59, the login processing unit 42 may shift the state of the worker terminal 5 to the logout state in response to the access, to the images captured by all the surveillance cameras 2T, being prohibited.

In step S69, the registration unit 43 deletes the registered contents of the surveillance camera 2T that is the work target. The registration unit 43 may delete the camera ID of the surveillance camera 2T, the contact address of the worker, the terminal ID of the worker terminal 5, the work contents, or the like.

Thereby, when the work is performed again on the same surveillance camera 2T, the operations of FIG. 2 and FIG. 3 are performed again. Here, when a second worker, different from a first worker who previously performed the work on the same surveillance camera 2T, performs the work, the registration unit 43 may register the surveillance camera 2T again in response to a request from the second worker. In addition, the access permission unit 450 may permit again the access from the worker terminal 5 of the second worker to the image captured by the registered surveillance camera 2T via the surveillance network 3.

With the above-described operation, the notification to the worker includes the link to the captured image, and thus it is possible to facilitate the access to the captured image.

In addition, the access from the worker terminal 5 in the login state is permitted, and thus it is possible to prevent the image captured by the surveillance camera 2T from being accessed by a third party who does not have an authority to log in, and to enhance the security of the captured image.

In addition, the registered contents are deleted in response to the work being completed, it is possible to reliably prevent the access to the image captured by the surveillance camera 2T for which the work is completed.

In addition, in response to the request from the second worker, different from the first worker who previously performed the work on the same surveillance camera 2, the surveillance camera 2 is registered, and the access from the worker terminal 5 of the second worker to the image captured by the registered surveillance camera 2 via the surveillance network 3, is permitted, and thus it is possible to permit, each time the work is performed, the worker to access the captured image.

3. Modification Example

Note that in the above-described embodiment, the device 4 has been described to have the communication unit 40, the image storage unit 41, the work log recording unit 46, the login processing unit 42, and the notification unit 44; however, the device 4 may not have any of these.

In addition, the image captured by each surveillance camera 2 has been described to be stored in the device 4, but may be stored in the gateway device 30. In this case, the access permission unit 450 may permit the access to the captured image stored in a storage area of the gateway device 30. For example, the access permission unit 450 may permit the captured image to be transmitted from the gateway device 30 to the device 4, and to be transferred from the device 4 to the worker terminal 5.

In addition, the access permission unit 450 has been described to permit the access to the captured image in response to the access request from the worker terminal 5 being made; however, in response to a scheduled date and time of the work arriving, instead of or in addition to the access request being made, the access may be permitted. The scheduled date and time of the work may be registered in advance in the registration unit 43 in association with the surveillance camera 2T that is the work target. This makes it possible to prevent the access at a time different from the scheduled date and time of the work, and to further enhance the security of the captured image.

In addition, the access prohibition unit 451 has been described to prohibit the access in response to receiving, from the worker terminal 5, the work completion notification, but may prohibit the access in response to an operation by an operator of the device 4 who has confirmed the completion of the work, or may prohibit the access in response to a predetermined work period elapsing. Even in these cases, the security of the captured image can be enhanced by prohibiting the access. Here, the work period may be a period determined by the start time and the end time of the work (as an example, a period from 10:00 to 15:00 on September 1st), or may be registered in the registration unit 43. In addition, the work period may be a time width (as an example, 3 hours or 1 day), may be registered in the registration unit 43, or may be set by default in the access prohibition unit 451.

Further, various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable media may include any tangible device that can store instructions to be executed by a suitable device, and as a result, the computer-readable medium having instructions stored in the tangible device comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. Specific examples of the computer-readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, or the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc., so that the computer-readable instructions are executed to create means for performing operations specified in the flowcharts or block diagrams. Examples of the processor include a computer processor, a processing unit, a microprocessor, a digital signal processor, a controller, a microcontroller, and the like.

Figure 4:
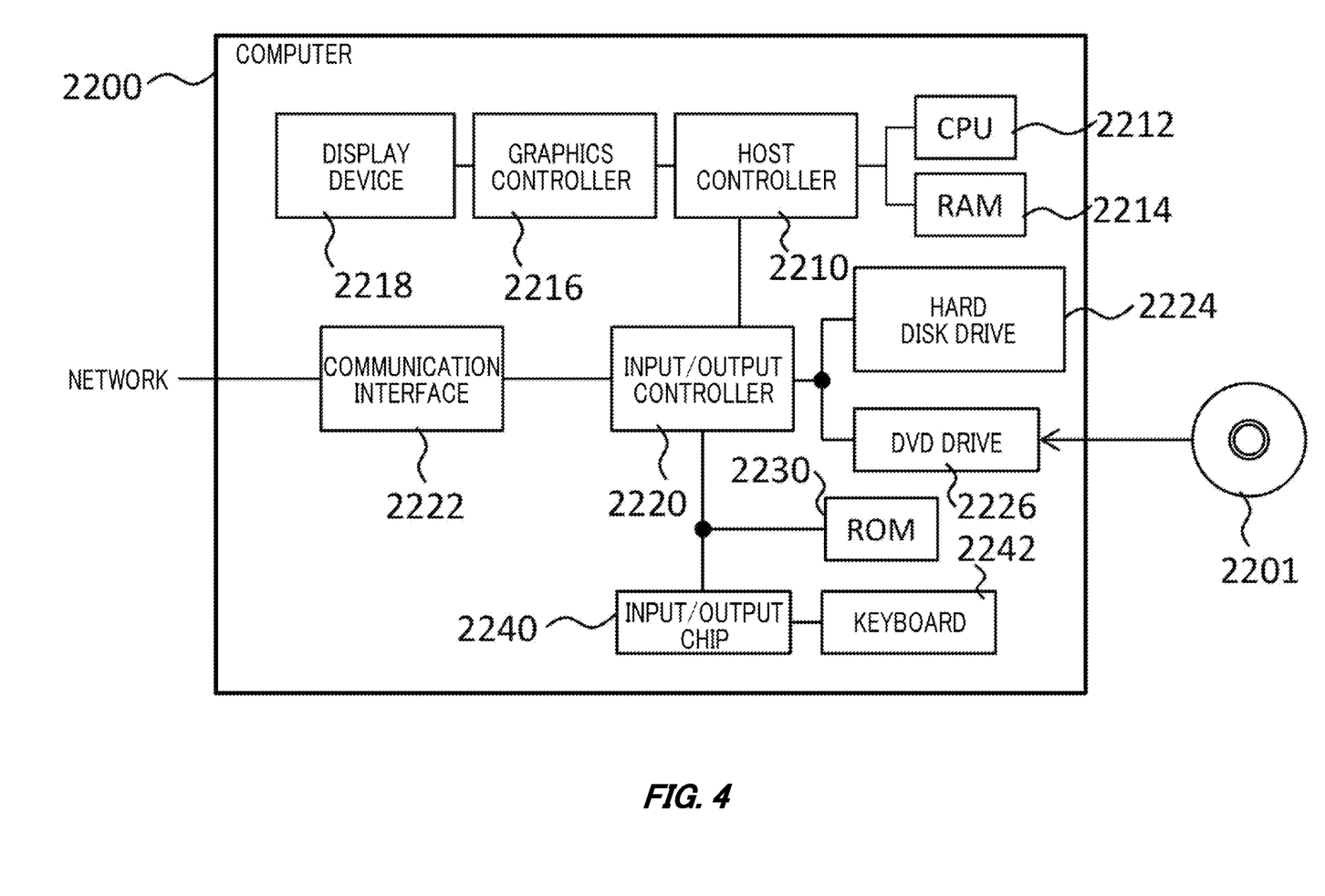
FIG. 4 shows an example of a computer 2200 in which a plurality of aspects of the present invention may be embodied entirely or partially.

FIG. 4 shows an example of a computer 2200 in which a plurality of aspects of the present invention may be embodied entirely or partially. A program that is installed in the computer 2200 can cause the computer 2200 to function as operations associated with apparatuses according to the embodiments of the present invention or one or more sections of the apparatuses thereof, or can cause the computer 2200 to perform the operations or the one or more sections thereof, and/or can cause the computer 2200 to perform processes according to the embodiments of the present invention or steps of the processes thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from a DVD-ROM 2201, and provides the hard disk drive 2224 with the programs or the data via the RAM 2214. The IC card drive reads the program and data from an IC card, and/or writes the program and data to the IC card.

The ROM 2230 stores, in itself, a boot program or the like that is executed by the computer 2200 during activation, and/or a program that depends on hardware of the computer 2200. The input/output chip 2240 may also connect various input/output units to the input/output controller 2220 via a parallel port, a serial port, a keyboard port, a mouse port, and the like.

A program is provided by computer-readable media such as the DVD-ROM 2201 or the IC card. The program is read from the computer-readable medium, installed in the hard disk drive 2224, the RAM 2214, or the ROM 2230, which is also an example of the computer-readable medium, and executed by the CPU 2212. The information processing written in these programs is read into the computer 2200, resulting in cooperation between a program and the above-mentioned various types of hardware resources. An apparatus or method may be constituted by realizing the operation or processing of information in accordance with the usage of the computer 2200.

For example, when a communication is executed between the computer 2200 and an external device, the CPU 2212 may execute a communication program loaded in the RAM 2214, and instruct the communication interface 2222 to process the communication based on the processing written in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (the DVD-ROM 2201), the IC card, etc., and perform various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may execute various types of processing on the data read from the RAM 2214 to write back a result to the RAM 2214, the processing being described throughout the present disclosure, specified by instruction sequences of the programs, and including various types of operations, information processing, condition determinations, conditional branching, unconditional branching, information retrievals/replacements, or the like. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-described program or software modules may be stored in the computer-readable media on the computer 2200 or near the computer 2200. Further, a recording medium such as a hard disk or a RAM provided in a server system connected to a dedicated communication network or the Internet can be used as a computer-readable medium, thereby providing the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 1 security system
2 surveillance camera
3 surveillance network
4 device
5 worker terminal
10 communication network
30 gateway device
40 communication unit
41 image storage unit
42 login processing unit
43 registration unit
44 notification unit
45 access control unit
46 work log recording unit
300 communication unit
450 access permission unit
451 access prohibition unit
2200 computer
2201 DVD-ROM
2210 host controller
2212 CPU
2214 RAM
2216 graphics controller
2218 display device
2220 input/output controller
2222 communication interface
2224 hard disk drive
2226 DVD-ROM drive
2230 ROM
2240 input/output chip
2242 keyboard

What is claimed is:

1. A device comprising at least one memory and at least one processor having instructions for registering, wherein:
the at least one processor registers a surveillance camera that is a work target;
the at least one processor permits access from a worker terminal to an image captured by the registered surveillance camera via a surveillance network to which the surveillance camera is connected;
the at least one processor prohibits the access in response to work on the surveillance camera being completed;
the at least one processor registers a scheduled date and time of the work in association with the surveillance camera that is the work target; and
the at least one processor permits the access in response to the scheduled date and time of the work arriving.

2. The device according to claim 1, wherein
the at least one processor permits the image captured by the registered surveillance camera to be transmitted to the worker terminal.

3. The device according to claim 1, wherein:
the at least one processor receives a login of a worker,
the at least one processor registers the surveillance camera specified in a login state of the worker, and
the at least one processor permits the access from the worker terminal in the login state of the worker.

4. The device according to claim 2, wherein:
the at least one processor receives a login of a worker,
the at least one processor registers the surveillance camera specified in a login state of the worker, and
the at least one processor permits the access from the worker terminal in the login state of the worker.

5. The device according to claim 1, wherein;
the at least one processor registers a contact address of the worker in association with the surveillance camera that is the work target, and
the at least one processor transmits a notification to the contact address in response to the registered surveillance camera being connected to the surveillance network and being activated.

6. The device according to claim 2, wherein:
the at least one processor registers a contact address of the worker in association with the surveillance camera that is the work target, and
the at least one processor transmits a notification to the contact address in response to the registered surveillance camera being connected to the surveillance network and being activated.

7. The device according to claim 5, wherein
the notification includes a link to the image captured by the surveillance camera.

8. The device according to claim 1, wherein
the at least one processor prohibits the access in response to a predetermined work period elapsing.

9. The device according to claim 2, wherein
the at least one processor prohibits the access in response to a predetermined work period elapsing.

10. The device according to claim 1, wherein
the at least one processor prohibits the access in response to receiving, from the worker terminal, upon a notification indicating that the work is completed.

11. The device according to claim 2, wherein
the at least one processor prohibits the access in response to receiving, from the worker terminal, upon a notification indicating that the work is completed.

12. The device according to claim 1, wherein
the at least one processor deletes registered contents of the surveillance camera in response to the work on the surveillance camera being completed.

13. The device according to claim 2, wherein
the at least one processor deletes registered contents of the surveillance camera in response to the work on the surveillance camera being completed.

14. The device according to claim 1, wherein:
the at least one processor records the image captured by the surveillance camera as a work log for the surveillance camera.

15. The device according to claim 2, wherein:
the at least one processor records the image captured by the surveillance camera as a work log for the surveillance camera.

16. The device according to claim 1, wherein
the at least one processor registers the surveillance camera in response to a request from a second worker different from a first worker who previously performed the work on the surveillance camera, and
the at least one processor permits access from a worker terminal of the second worker to the image captured by the registered surveillance camera via the surveillance network.

17. A method comprising:
registering a surveillance camera that is a work target;
permitting access from a worker terminal to an image captured by the registered surveillance camera via a surveillance network to which the surveillance camera is connected;
prohibiting the access in response to work on the surveillance camera being completed;
registering a scheduled date and time of the work in association with the surveillance camera that is the work target; and
permitting the access in response to the scheduled date and time of the work arriving.

18. A non-transitory storage medium having stored thereon a program that causes a computer to:
register a surveillance camera that is a work target;
permit access from a worker terminal to an image captured by the registered surveillance camera via a surveillance network to which the surveillance camera is connected;
prohibit the access from the worker terminal to the image captured in response to work on the surveillance camera being completed;
register a scheduled date and time of the work in association with the surveillance camera that is the work target; and
permit the access in response to the scheduled date and time of the work arriving.

* * * * *